(12) United States Patent
Norrgård et al.

(10) Patent No.: US 7,706,300 B2
(45) Date of Patent: Apr. 27, 2010

(54) METHOD FOR PROVIDING TOPOLOGY AWARENESS INFORMATION WITHIN AN IP NETWORK

(75) Inventors: Joakim Norrgård, Luleå (SE); Olov Schelén, Norrfjaäarden (SE); Emil Svanberg, Luleå (SE); Johan Alldén, Luleå (SE)

(73) Assignee: Netsocket, Inc., Plano, TX (US)

( * ) Notice: Subject to any disclaimer, the term of this patent is extended or adjusted under 35 U.S.C. 154(b) by 1533 days.

(21) Appl. No.: 10/506,164

(22) PCT Filed: Apr. 29, 2002

(86) PCT No.: PCT/SE02/00828

§ 371 (c)(1),
(2), (4) Date: Aug. 31, 2004

(87) PCT Pub. No.: WO03/075527

PCT Pub. Date: Sep. 12, 2003

(65) Prior Publication Data

US 2005/0105475 A1    May 19, 2005

Related U.S. Application Data

(60) Provisional application No. 60/361,306, filed on Mar. 4, 2002.

(30) Foreign Application Priority Data

Mar. 4, 2002    (SE) .................................... 0200678

(51) Int. Cl.
*H04L 12/28*    (2006.01)

(52) U.S. Cl. ..................................................... 370/254
(58) Field of Classification Search ................. 370/254, 370/236.1, 236.2, 255, 392, 395.31, 395.32
See application file for complete search history.

(56) References Cited

U.S. PATENT DOCUMENTS 5,185,860 A    2/1993   Wu (Continued)

FOREIGN PATENT DOCUMENTS

EP    0 613 316    8/1994

(Continued)

OTHER PUBLICATIONS

Postel, J., "User Datagram Protocol," RFC 768, Aug. 28, 1980, pp. 1-3.

(Continued)

*Primary Examiner*—Gregory B Sefcheck
*Assistant Examiner*—Otis L Thompson, Jr.
(74) *Attorney, Agent, or Firm*—Slater & Matsil, L.L.P.

(57) ABSTRACT

A method, a unit and a computer program product for providing topology awareness information within an IP network includes a central node and a plurality of routers, wherein the probe is implemented in a router within the IP network and the probe belongs to a topology awareness system, that includes: elements for obtaining and maintaining relationship with other probes within the IP network, elements for collecting information about other network elements e.g. routers and switches, elements for communicating topology information with the central node of the topology awareness system, and elements for obtaining information concerning local resources on the router where the probe is implemented.

27 Claims, 5 Drawing Sheets

U.S. PATENT DOCUMENTS

Figure 2:
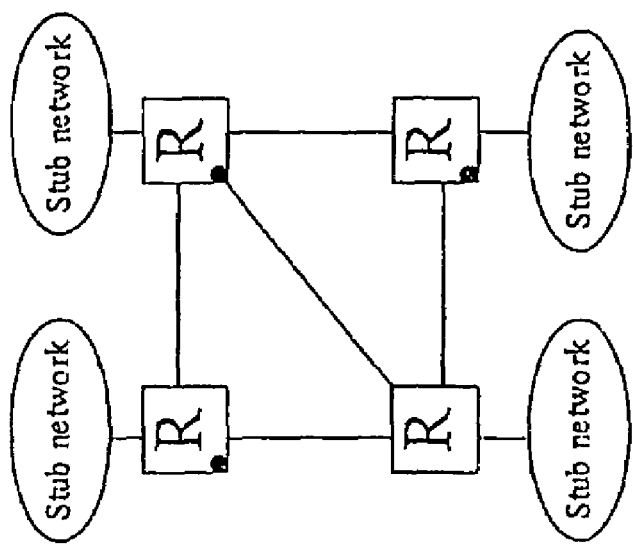

| | | | |
|---|---|---|---|
| 5,546,540 A * | 8/1996 | White | 709/223 |
| 5,684,796 A * | 11/1997 | Abidi et al. | 370/389 |
| 5,708,772 A | 1/1998 | Zeldin et al. | |
| 5,848,243 A | 12/1998 | Kulkarni et al. | |
| 5,850,397 A * | 12/1998 | Raab et al. | 370/392 |
| 5,886,643 A | 3/1999 | Diebboll et al. | |
| 5,948,055 A | 9/1999 | Pulsipher et al. | |
| 6,108,702 A | 8/2000 | Wood | |
| 6,192,051 B1 | 2/2001 | Lipman et al. | |
| 6,205,122 B1 | 3/2001 | Sharon et al. | |
| 6,246,689 B1 | 6/2001 | Shavitt | |
| 6,252,856 B1 | 6/2001 | Zhang | |
| 6,775,709 B1 * | 8/2004 | Elliott | 709/238 |
| 7,133,368 B2 * | 11/2006 | Zhang et al. | 370/249 |

FOREIGN PATENT DOCUMENTS

| | | |
|---|---|---|
| EP | 0 773 649 A2 | 5/1997 |
| EP | 0 800 329 | 10/1997 |
| WO | WO 00/33205 A1 | 6/2000 |

OTHER PUBLICATIONS

Oran, D., "OSI IS-IS Intra-Domain Routing Protocol," Network Working Group, RFC 1142, Feb. 1990, pp. 1-152.

Case, J., et al., "A Simple Network Management Protocol (SNMP)" Network Working Group, RFC1157, May 1990, pp. 1-36.

Moy, J., "OSPF Version 2," Network Working Group, RFC 2328, Apr. 1998, pp. 1-244.

* cited by examiner

METHOD FOR PROVIDING TOPOLOGY AWARENESS INFORMATION WITHIN AN IP NETWORK

FIELD OF THE INVENTION

The present invention relates to an Internet Protocol (IP) network.

In particular, it relates to a method, a topology awareness unit and a computer program product that provides a topology awareness system within the IP network.

BACKGROUND OF THE INVENTION

Many communication networks are migrating towards all-IP solutions. As the variety of applications based on IP networks grow, the need for sophisticated control and management systems increases. IP networks are by nature de-centralised. Each network node, i.e., router, can operate individually without the control of a central authority. There are applications that would benefit from central control and network operators often want to be in control of their network using a single centralised operations centre. In other words, applications or systems that need information on how routers are interconnected and how they route traffic between each other are becoming more common.

Herein, all systems providing the desired topological information are denoted as topology awareness systems.

STATE OF THE ART

There are several approaches for collecting topology information, some of which are described in overview here. Common for all topology awareness systems described are the ability to:

Communicate topological information to a central node. The central node can use the information for a variety of purposes, some of which are network visualisation and graphical management interfaces. Generic topology awareness services such as path lookups can also be provided by the system.

Collect routing information, information on router interfaces and what is considered as meta data about routers (e.g., textual representations of node names or other humanly readable things).

Below, some of the known methods for topology awareness are described. Some strengths and weaknesses of the individual approaches are given as well. The purpose of this is to highlight the problem that is solved with the present invention.

Probing all Routers

IP routers commonly provide access to a variety of information via the standardised network management protocol SNMP that is defined in Case J., Fedor M., Schoffstall M. Davin J., A Simple Network Management Protocol (SNMP), IETF, RFC1157. The information, which is accessible via SNMP, is stored in Management Information Bases (MIBs). In particular, the information needed for topology awareness is readily available in standardised and commonly supported MIBs.

A topology awareness system can access MIBs to learn about the topology. Within the description of the present invention, the term probing is used when accessing MIBs on a router in order to obtain topology information (or any other system supporting SNMP for that matter). A well-known and straightforward topology awareness method based on SNMP probing is described in U.S. Pat. No. 5,185,860. The solution according to the US patent, is to start at a first router and figure out which routers are directly connected neighbours to the first router and to probe the neighbouring routers. For every new router that is discovered to be a neighbour, the probing process has to be extended another hop to reach beyond the newly discovered router. The procedure is recursively applied until no further routers are found. Other algorithms for topology awareness based on SNMP probing can of course be applied as well. The common denominator would be that all routers have to be probed for all information.

Topology awareness systems based on this approach can be implemented either in a single node or in a distributed system with a plurality of probes and a central node.

Strengths

One obvious benefit with any approach based on SNMP is that it is independent of the routing protocol that is being used in the domain. Other benefits of similar approaches are:

The information is available in standardised MIBs.

The tools needed for constructing systems like these are readily available and straightforward to use.

Weaknesses

There are several potential problems with the SNMP based approaches. The two basic problems are that the amounts of signalling will be significant and that the SNMP protocol is known to be unreliable (it is based on UDP that is described in Postel J., User Datagram Protocol, IETF, RFC768 transport which provides no guarantees of delivery). A topology awareness system solely based on SNMP has to collect rather large volumes of data, which may be problematic.

Another problem, which may be the most critical for certain types of topology awareness systems, is that the support for dynamic discovery of changes is weak. There are two major alternatives for implementing dynamic topology awareness based solely on SNMP. These are:

Use periodical polling to make sure that all changes are discovered. The compromise here lies in signalling overhead versus the time it takes to discover changes. Frequent polling will cause a lot of signalling overhead while less frequent polling will lead to a less exact representation of the topology in the topology awareness system.

Rely on SNMP traps, which are unsolicited SNMP messages initiated by routers at certain events. This way, at least in theory, a router can inform the topology awareness system about topology changes. Some of the problems with this approach are that can be lost due to the unreliable nature of SNMP and that the flexibility by which traps are configured is limited. Not all router events can be associated with an SNMP trap.

Link-State Routine Protocols

There is a family of routing protocols known as link-state protocols. The most common link-state protocols are IS-IS that is described in Oran D., OSI IS-IS Intra-domain Routing Protocol, IETF, RFC11428 and OSPF that is described in Moy J., OSPF Version 2, IETF, RFC2328. Link-state protocols are based on the principle that all routers keep an up to date database with information on all routers in the domain. The routing protocols are designed to keep the databases of the individual routers synchronised at all times.

In domains where this type of routing protocol is deployed, a topology awareness system can take advantage of the link-state principle and learn about all routers in the topology from routing protocol messages. Protocol messages can be accessed either by participating actively in the routing protocol (e.g., acting as a router) or by passively sniffing the network.

In any event, topology awareness systems based on the link-state principle learns about all routers and their routing information without explicit signalling. Note that this is relevant for changes as well. In addition to the information available in the link-state database, SNMP can be used to probe individual routers for other data.

Strengths

Learning about the entire topology (routers and routing data) without explicitly signalling individual routers is a big improvement in comparison to SNMP based systems. Another important strength is that changes in routing will be readily available through the routing protocol. No polling or traps from routers is required.

Weaknesses

If further information, beyond what is available in the link-state database, is required by the topology awareness system, the link-state principle must be combined with another mechanism, such as SNMP probing. This means that some data may still have to be collected from individual routers.

Another potential problem with this approach is that the reliability and performance of the topology awareness system depend very much on the behaviour of routers nearby the probe. For instance, if the node participating in the routing protocol on behalf of the topology awareness system is connected directly to a single router and the routing protocol process of that router fails, the topology awareness will be lost.

Topology Awareness Components in all Routers

One approach to topology awareness is that there is a customized component in every router, which is designed to provide a centralised system with the needed topology information. Such components could use SNMP locally, they could take advantage of routing protocol messages, they could use platform specific Application Programming Interfaces (APIs) to get information or they could use a combination of all these methods.

Strengths

Deploying a topology awareness component locally on every router eliminates the need for mechanisms to learn about other routers and their routing data. The inherent problems of the other methods are overcome to a certain extent. This means that the mechanisms by which the topology information is collected can be made much more reliable and robust.

Weaknesses

The method assumes that all routers have the topology awareness component. This means that a domain cannot be heterogeneous in terms of router makes for this approach to function properly. Unless all routers support the topology awareness component, there will be holes in the topology awareness.

Another problem is that of communicating the information to the central node of the topology awareness system. If all routers establish connections to a central node, this node may potentially be overloaded with simply managing all the connections.

Summary of the Topology Awareness Options

The approaches of the "Probing all routers" sections and "Link-state routing protocols" section are suitable for implementation in a hierarchical manner where a probe node is deployed in the network to collect the topology awareness information and a central node which stores and processes the information.

Figure 1:
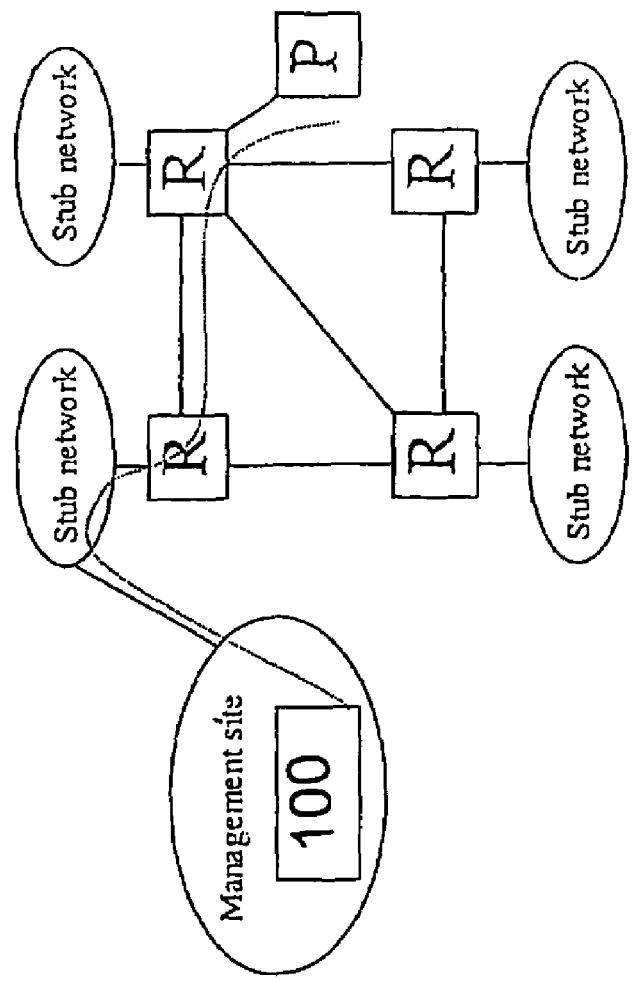

An example of this is depicted in FIG. 1. The squares marked R are regular routers while the one marked P is a unit called probe that implements the topology awareness functionality.

The probe P connects to the central node of the topology awareness system and the central node 100 is located at a management site.

For some networks, deploying an additional node in the network is not desirable due to deployment costs and management issues. In such cases it would be beneficial if the topology awareness functionality could be deployed on the routers themselves, as described in the "Topology awareness components in all routers" section. An example of this approach is depicted in FIG. 2 (the central node is not shown).

In the FIG. 2, topology awareness units, or probes, are implemented on the routers marked with a filled circle in the lower left corner. All routers in the domain but one has implemented the probe. Thus, there will be a hole in the topology awareness system as discussed in the "weakness section" in the "Topology awareness components in all routers" section. Basically, if the entire topology is to be completely discovered, there must be additional functionality.

Problems of the State of the Art

In the following, three different problems of the state of the art are discussed, i.e. signalling overhead, robustness and managing a large set of topology awareness probes.

Signalling Overhead

The signalling required for a topology awareness system that uses probes is divided in two categories.

A. The signalling required in the network plane to collect the topology information from probe to router or from probe to probe.
  B. The signalling involved in communicating topology information from probes to the central node of the topology awareness system.

Depending on the topology awareness solution, the signalling overhead will be somewhat different in both categories.

A. Network Plane Signalling

Any solution that uses SNMP to collect information will cause a fair amount of signalling. In the case where one (or a few) topology awareness probes are run in a domain, the probes have to use SNMP to routers many hops away. The unreliable nature of SNMP implies that retransmissions on the application layer will be needed. A system that must be very fast will cause more signalling overhead whereas one that does not need to be as fast will cause less.

In solutions where there is a topology awareness component running on most, but not all, routers. The amount of overhead signalling can be quite overwhelming if complete topology awareness is desired. In cases where the topology and routing information is to be updated continuously as routing changes, even more signalling will be required.

All compliant routers, i.e., those that comprise the topology awareness unit (e.g., a probe) will at a minimum probe all their direct neighbours, and if there are non-compliant routers among those, further probing is required. As soon as a non-compliant router is discovered, probing of that router will be initialised. Routers that are compliant will probe all directly connected neighbours that are non-compliant.

Figure 3:
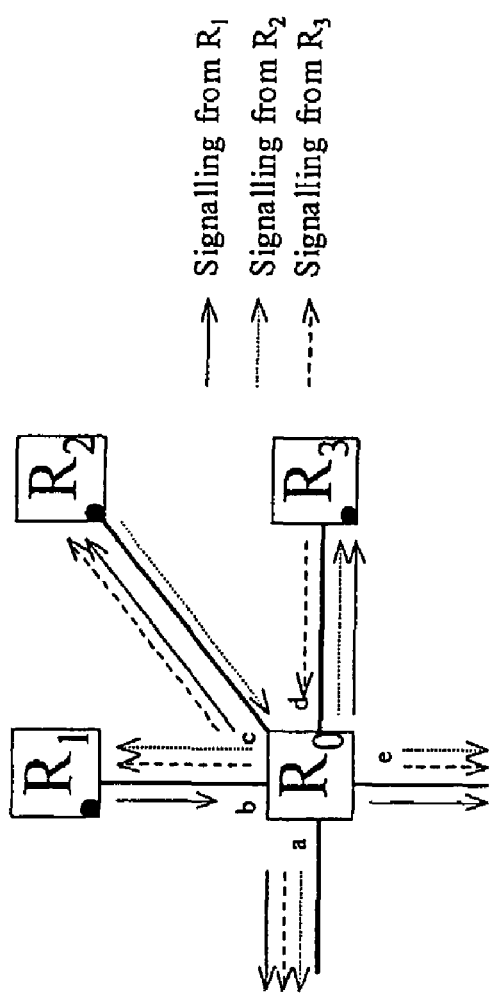

A signalling example is illustrated in FIG. 3 where routers $R_1$ through $R_3$ implement the topology awareness component while $R_0$ does not. Router $R_1$ will probe its neighbour and discover that it is a non-compliant router. To make sure that there are no non-compliant routers further away, $R_1$ must engage in probing the neighbours of $R_0$ on the interfaces a, c, d and e (b can be skipped since that is where $R_1$ connects). On interfaces c and d $R_1$ will learn that there are compliant routers, namely $R_2$ and $R_3$. For interfaces a and e, probing may have to continue depending on what the neighbours are. Now consider that routers $R_2$ and $R_3$ must perform similar steps when learning about $R_0$ and its neighbourhood. This results in a fairly large number of redundant probing messages.

In the case where there are one (or a few) completely SNMP based probes, signalling could potentially be reduced by deploying probes within most of the routers, avoiding most of the problematic multi-hop SNMP issues.

When there are probes on most routers, the signalling could be reduced if additional functionality was added so that the probe implementing routers could share the burden.

B. Communicating Topology Information

There is a trade-off between the processing power required in the central node and the bandwidth that is used between probes and the central node of the system. There are two major approaches:

Minimize bandwidth. Let the probes collect and communicate a graph representation of the topology and let the central node of the system perform calculations on the graph to provide its topology awareness functions. This uses a lightweight representation of the network but requires the central node of the system to perform on-demand calculations to find the shortest path every time a route is looked up.

Minimize processing in the central node of the system. Let probes collect (or compute) and communicate routing entries to the central node of the system. Representing the network with routing entries requires more bandwidth for transport and memory for storage, but is more efficient in terms of processing in the central node of the system.

Under any of the above models, there is plenty of room for optimisation of the bandwidth usage by reducing the signalling overhead.

Robustness

If the topology awareness system is a critical component in a larger system, it is likely that there will be very strict requirements for robustness. Robustness in terms of topology awareness is related to how accurate the topology awareness system is and how fast changes are detected and propagated. The link-state based approach mentioned in the "Link-state routing protocols" section is good at keeping an accurate representation up to date with very good performance properties. It is however somewhat vulnerable. Only slight problems with the routing process of the neighbours to a link-state based topology awareness probe will have great impact on the topology representation. This problem requires a solution where several topology awareness probes can work together to provide the needed information.

Managing a Large Set of Topology Awareness Probes

Routing domains can grow to quite large numbers of routers. It is common that routing domains have hundreds of routers. Future enhancements to router implementation will probably make even larger domains possible. If topology awareness is implemented in every router in a large domain, managing connections to all those probes gets complex. A scheme providing hierarchy and aggregation would be useful for solving this problem.

Thus, the objective problem of the present invention is to provide a method, a topology awareness unit and a computer program product to facilitate efficient obtaining of topology information within an IP network. I.e., to reduce signalling overhead, to increase the robustness and to be able to manage a large set of topology awareness probes.

SUMMARY OF THE INVENTION

The above-mentioned objective problem is solved by the present invention according to the independent claims.

Preferred embodiments are set forth in the dependent claims.

An advantage with the present invention is that it provides a topology awareness system usable in heterogeneous IP networks.

Another advantage is that it provides a topology awareness system that is flexible, scalable and provides high performance and accuracy.

Yet another advantage with the present invention is that the probes can be configured for lightweight operation to minimise negative performance impact on the router, or if they exist on resource rich routers, they can accept more workload.

BRIEF DESCRIPTION OF THE APPENDED DRAWINGS

Figure 4:
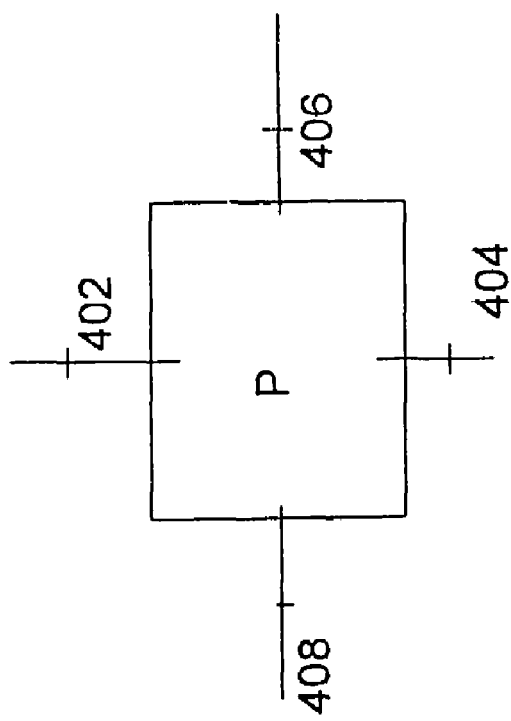
Figure 5:
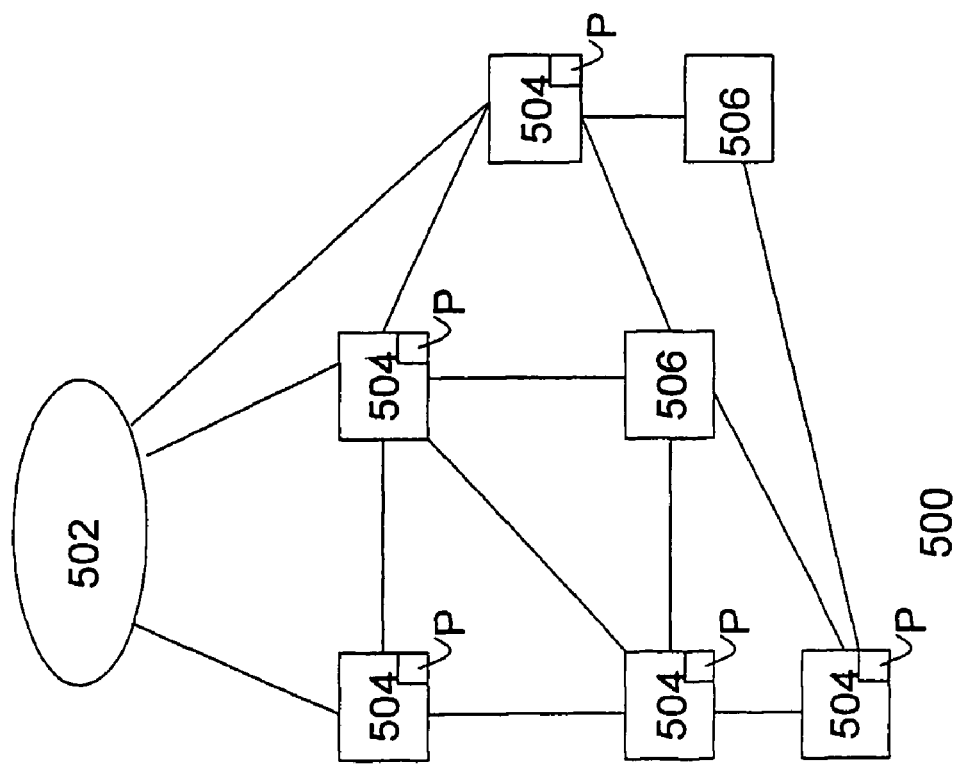
Figure 6A:
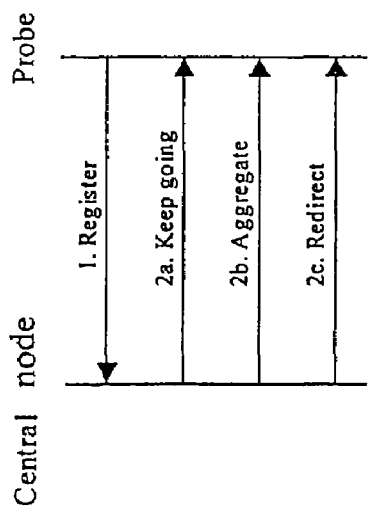
Figure 6B:
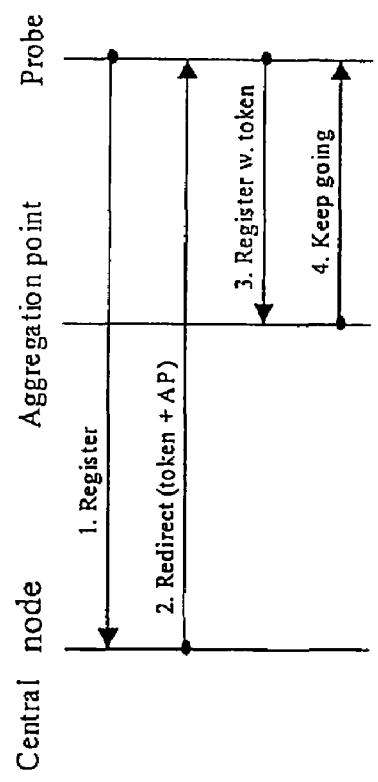
Figure 7:
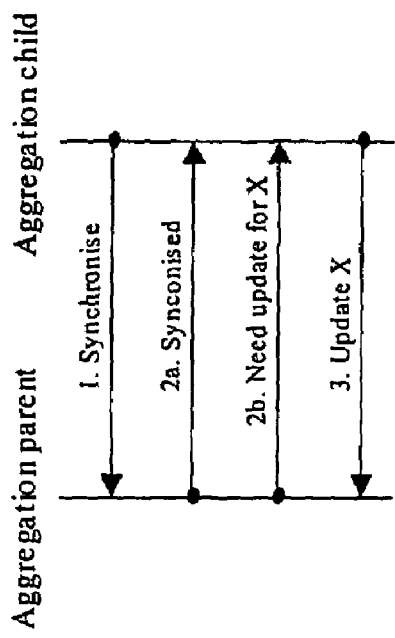
Figure 8:
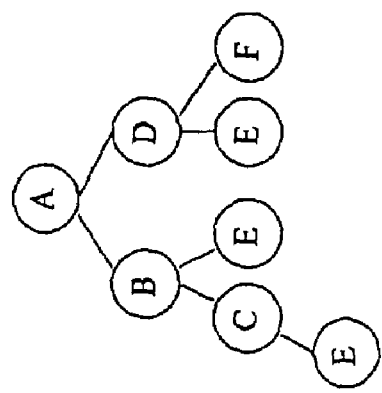
Figure 8:
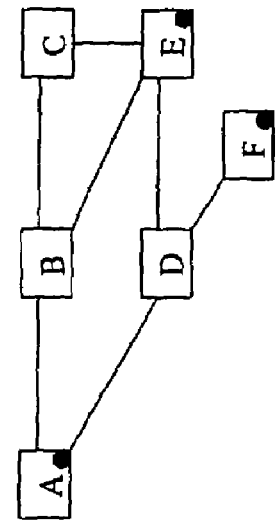

FIG. 1 illustrates a stand-alone topology awareness probe.
FIG. 2 illustrates probes implemented on the routers.
FIG. 3 further illustrates a signalling scenario.
FIG. 4 further illustrates the interfaces of the topology awareness probe according to the present invention.
FIG. 5 illustrates a topology awareness system in accordance with the present invention.
FIG. 6*a* illustrates the signalling scenario: Register a probe according to the present invention.
FIG. 6*b* illustrates the signalling scenario: Registration with redirect according to the present invention.
FIG. 7 illustrates a synchronise example according to the present invention.
FIG. 8 illustrates a sample probe topology and adjacency tree according to the present invention.

DETAILED DESCRIPTION OF PREFERRED EMBODIMENTS

The topology awareness system in accordance with the present is designed to overcome the problems listed above. Thus, the topology awareness system 500 according to the present invention shown in FIG. 5 provides:

Mechanisms for maintaining probe adjacencies (addresses the signalling problems).

Method for topology awareness probes to automatically configure themselves in a hierarchical manner and implement connection aggregation (addresses the robustness and managing a large set of routers problems).

Protocol mechanisms for communicating topology state in an efficient manner (addresses the last-mentioned signalling problem).

A system that combines the above to provide robust and efficient topology awareness functions.

The topology awareness system 500 is shown in FIG. 5. The system 500 comprises a central node 502 and topology awareness units P, referred to as probes, running on at least one router 504 in a domain. There are no constraints on how many of the routers in a domain that must implement the topology awareness probe P. There may be a probe in any number of routers ranging from one single router to all routers in the domain. However, it is preferred that most of the routers 504 within the domain comprise a topology awareness probe P. Routers that does not comprise a probe P (i.e. non-compliant routers) are marked with 506. The central node 502 is connected to at least one router 504 that comprises a probe P. Moreover, the routers are connected to other routers, wherein some of the routers that comprise a probe P are suitable as aggregation points. A topology awareness probe P is a unit capable of obtaining topology information from other units within an IP network and implemented by means of software running within an otherwise normal router. The topology information may be accessible via SNMP and stored in MIBs. A MIB is located within a router.

Topology information is communicated to the central node 502 from the probes P and the central node 502 may use the information for a variety of purposes, e.g. network visualisation and graphical management interfaces. Hence, the central node 502 stores and processes the topology information. The central node 502 of the system may for example be located either using a statically configured address or using a reserved anycast address (i.e. an anycast address is contacted, wherein the anycast address may be associated with one or more computers within a group, and one of the computers within the group responds) within the managed routing domain.

The functionality of the probe P is described in terms of its interfaces, topology awareness system interface 402, local resources interface 406, network interface 404 and probe adjacencies interface 408 as shown in FIG. 4. The topology awareness system interface is hereafter referred to as system interface 402. The details of each interface are given in the sub-sections that follow. In overview, the functionality of each interface is:

Topology awareness system interface 402—the topology awareness probe is a part of a topology awareness system. The system comprises a central node and additional probes. Topology information is communicated to the central node from a probe via this interface.

Network interface 404—the probe collects information about other network elements that does not comprise a topology awareness probe (e.g., routers and switches) across this interface. In current Internet standard, SNMP would be a common protocol used for this interface.

Local resources interface 406—since the probe is running on an otherwise normal router, there is topology information to obtain locally on the router.

Probe adjacencies interface 408—each probe maintains relationships with adjacent probes in order to minimise signalling across the network interface and the topology awareness system interface.

By using a topology awareness probe P that comprises a topology awareness system interface 402, topology information is communicated efficiently, by optimising the signalling. Robustness and management of a large set of topology awareness probes are achieved by registration of probes at a central node and introduction of aggregation points. Thus, the system may be automatically configured.

By using a topology awareness probe P that comprises a probe adjacencies interface 408, the topology information signalling is reduced by using path signalling to in order to obtain topology information from domains with non-compliant routers. Thus, data transmission over the topology awareness system interface and the network interface is minimised. The interface provides enhanced robustness by becoming adjacent i.e. by supervising each other. The probes P are thus able to be dynamically automatically configured by using probe registration and aggregation points. The network plane signalling is reduced by using probe territories for minimised probing, i.e. this ensures that no overlapping actions are performed for the network interface. Hence, the signalling over the system interface and network interface is minimised which implies that the problem shown in FIG. 3 is avoided.

The network interface 404 collects information from non-compliant routers, i.e. routers without a probe, and thereby reduces network plane signalling.

The local resources interface 406 reduces the network plane signalling by using locally available resources for topology information. An enhanced overall performance is thus obtained when this interface is employed.

The topology awareness probe P may comprise the topology awareness system interface 402 in any combination with the other three interfaces (i.e. probe adjacencies 408, network 404 or local resources interface 406). Preferably, the probe comprises all four interfaces in order to provide robust and efficient topology awareness functions.

The interfaces are described in the sub-sections below, using a mix of signalling diagrams and explanatory text. Note that the intention is not to pinpoint the exact details of the messages, what messages that are exchanged or formatting and contents of individual messages. The idea is rather to provide enough information to make the overall functionality understandable, and not to mandate details for implementation.

Topology Awareness System Interface

In a first preferred embodiment of the present invention, the topology awareness probe P comprises the system interface 402.

If there are probes in most of the routers in a large domain, managing connections and multiplexing messages is a complex issue. This is addressed by this interface that connects the topology awareness probe to the rest of the topology awareness system, wherein the rest of the topology awareness system 500 comprises a central node 502 and additional topology awareness probes P.

Probe Registration and Aggregation Points

Topology awareness probes P register with the central node 502 of the system when they are started. The initiative for registration lies in the probe P. When a register message is received by the central node 502 of the system, the identity of the probe P is added to the list of known ones stored within the central node 502. After that, a decision is made whether to accept the probe connection as it is (2a), use the probe as an aggregation point (2b) or redirect this probe to a previously selected aggregation point (2c). The signalling alternatives according to the first preferred embodiment are shown in FIG. 6a.

In case 2a, the probe will keep its relation to the central node 502 of the system and deliver all its topology information directly to it. In case 2b, the probe P will receive topology information from other probes P and deliver that, together with its own topology information, to the central node 502 of the system. In case 2c, the probe will tear down its relation to the central node of the system and establish a new one with an aggregation point identified in the redirect message.

Note that the details of how the aggregation decisions are made are not within the scope of this invention. It may, however be useful to enable probes to indicate their willingness to become aggregation points, i.e. forwarding topology information from other probes in addition to its own information, and include that in the decision making algorithm. It is obvious that both memory and processing requirements will be greater at aggregation probes P than at regular probes P.

A signalling scenario where a redirect-message is used according to the first preferred embodiment of the present invention is shown in FIG. 6b. The initial registration message (1) reaches the central node 502 of the system, which issues a redirect message (2). The redirect message contains information on where to redirect (AP) and also information that can be attached to the new register message (3) for authentication purposes. In the example, a token is issued by the central node 502 of the system. This token is passed along the registration message when the probe registers with the aggregation point. This enables authentication and authorisation of the registration at the aggregation point. Note that the token is an example. An implementation of this system could use other means for trust. Upon receiving the registration message, the aggregation point responds with a keep going message (4).

An important property of this method is that it allows the aggregation point (i.e. the probe P) to introduce further hierarchy if it wants to. In the example in FIG. 6b, there will be regular probes P at the bottom level, then the aggregation point and at the top there is the central node 502 of the system. If the aggregation point for some reason wants to introduce further hierarchy it would send a redirect message back to the probe P instead of the keep going message that is used in the example. There are many options for the algorithm used to decide if and when to introduce further hierarchy. A simple one could be based on the number of connections to lower-level probes P.

In general, there will be a parent and a child node in all aggregation relations in the system. At the top level, the central node P of the system is the parent and all its aggregation points are children.

The registration procedure (including redirect etc.) is repeated continuously (e.g. periodically or at random intervals) to allow all probes P acting as aggregation points (includes the central node of the system as well as all other aggregation points) to re-evaluate their situation. This interval should be sparse to keep signalling overhead at a minimum.

If, as the result of an outage in the network, a relation between an aggregation parent probe P and a child probe P is lost, the parent can issue unsolicited aggregate messages to any set of probes it has previously received registration messages from. Related to such an aggregate message there will be a set of redirect messages identifying the new aggregation point as well. This implies that all aggregation parents keep states of received registration messages.

Sending Topology Information

The amount of information required to represent the details of a large topology is significant. Methods are needed to minimise the amounts of information that are sent between child and parent in an aggregation relation.

To achieve both robustness and low signalling overhead, a scheme where information is based on updates is used, together with a synchronisation method that is repeated continuously (e.g. periodically). Probes P send unsolicited update messages when they have detected changes in the topology. A good behaving probe must implement filters to avoid sending updates as the result of periodical routing protocol updates etc. Only when an actual change in the topology has occurred, it is required to send update messages.

Formatting of topology information messages is not mandated by this invention. The requirement is that information is sent in the form of deltas, where each message inserts, modifies or removes a piece of information. Insert messages are sent for new information. If there are changes in existing data, modify commands are used for updates. Remove commands are sent for information that is no longer pertinent.

In addition to the update messages above, there is a synchronisation scheme (repeated continuously) that is designed to detect mismatching state in parent probes and child probes of an aggregation relation. Repeatedly, using sparse intervals, probes send a compressed representation of their topology information to their aggregation parent.

In FIG. 7, two synchronise scenarios according to the first embodiment of the present invention are shown. First the child probe P sends a synchronise message which contains a compressed representation of its state (i.e. topology information). The aggregation parent receives the message and compares it to its state for the current child. This can either be computed on demand or it could be kept in memory all the time. In case 2a, the parent found that the states match and sends an acknowledgement back. In case 2b, state mismatch was discovered (in this case the parent lacks a subset-X in contrast to the child) so the parent requests updates for sub-set X of information from the child. However, it is also possible to start the synchronisation by letting the parent send the synchronise message instead of the child and the child receives the message and compares it to its state for the current parent. It should be noted, that the aggregation parent may also be the central node.

The compressed representation of the topology information of a probe can for example be a set of checksums or cyclic redundancy checks. The choice of algorithm is left for implementation. A basic optimisation that should be considered by any implementation is the ability to identify a smaller sub-set of information where states mismatch. This makes is possible for a parent to be more precise in asking for updates. If such a mechanism is lacking, the entire state of the child has to be communicated when state mismatch is found.

Probe Adjacencies Interface

In a second preferred embodiment of the present invention, the probe comprises a probe adjacencies interface 408.

Probes use a custom protocol to establish and maintain adjacencies with each other. The basic function of the protocol is to let probes know of each other. The more advanced features of the protocol are designed to let probes inform each other on their surroundings (e.g., directly connected neighbours) and to enable probes to agree on which probe that does what.

The next section describes how adjacencies are established. The following sections describe two different modes of operation for the protocol after adjacencies have been established. In the "Probe territories for minimised probing"-section a usage model for general purposes topology awareness systems is given while the "Path signalling to avoid probing"-section provides a model for more specialised applications.

Becoming Adjacent

For each probe, a tree-structured view of the network is kept in order to decide which other probes to become adjacent with. Each probe keeps itself as the root of the tree. There will be one branch for each interface on the probe router. A branch may, or may not, consist of one or more non-compliant routers as intermediate nodes and an adjacent probe as the leaf. An example is given in FIG. 8.

In the FIG. 8, routers A, E and F, marked with a filled circle, have topology awareness probes running. Routers B, C and D are non-compliant. From the point of view of A, the adjacency tree at first contains two main branches, as shown to the right in the figure. Looking closer at the branches, A discovers that E occurs as a leaf more than once, which means that some branches can be pruned off. A chooses to prune longer branches before shorter ones which means that the (A, B, C, E) branch will be pruned. When this is done, A can prune off the (A, B, E) branch as well since E is found to be adjacent via D as well. The (A, D, *) branch is kept since both E and F can be reached that way. In short, a probe tries to keep as few and as short branches as possible in its adjacency tree. The conclusion is that A will maintain adjacencies with E and F, both via its branch to D. Note that branches need not be the same as actual routing, branches are logical. For instance, packets from A to E may be routed via B in the actual network; the adjacency tree will use the (A, D, E) branch anyway. This means that if there are two or more probes, each probe will have at least one adjacency. It also means that all compliant routers will be logically connected via a set of contiguous adjacencies. Each adjacency is kept alive using a message, preferably a small message that is sent repeatedly by each probe to all of its adjacent probes. This means that a lost probe can be discovered using timeouts in adjacent probes. Note that all probes will engage in the tree building and pruning exercise to establish its adjacencies. It is assumed that there is a deterministic way to determine whether a router is compliant or not by attempting an adjacency with it. The invention does not mandate a particular solution, but an example would be using a reserved transport protocol port number. This way, as probes investigate their neighbours (see the "network interface" section) they can attempt to establish adjacencies with them to determine if they are compliant or not. If an adjacency is lost due to a failing probe, the process of building the adjacency tree and then pruning some branches off must be completed again. Note that if some additional states are kept, a probe can know along which of its tree branches it must re-attempt adjacencies.

Probe Territories for Minimised Probing

A probe territory defines which non-compliant routers that a probe is responsible for probing. If the method for topology awareness is to actively probe all routers probe territories can be used to optimise signalling across the network interface of the probe. To do that, there should be no overlaps in probe territories. That is, each non-compliant router should belong to one probe territory only. This section describes how probe adjacencies are used to agree on non-overlapping territories. In the process of establishing probe adjacencies, each probe will see a set of non-compliant routers. The probes keep a list of non-compliant routers and a metric and a probe identifier is associated with each such router. The metric is a single dimension indication on how far away the non-compliant router is. For example, the metric could be the number of hops between the probe and the non-compliant router. The probe identifier is set to identify the probe that has the router in its territory. Initially, probes claim all non-compliant routers they have seen to belong to their territory.

For each pair of adjacent probes, there is one master and one slave. The master-slave relationship is determined when the adjacency is established and may, for example, be based on pre-configured probe priorities or which probe that initiated the adjacency. However, the slave sends a subset of its list of non-compliant routers to the master. The subset is the list of routers that are on the original adjacency tree branch between the two probes, before pruning is done.

Upon receiving the list of routers from the slave, the master compares it to its own list. Each entry that occurs in both the master and the slave lists is compared. Whichever probe has the smaller metric associated with the router gets it in its territory. If said metric of two probes are equal, the master probe uses some other deterministic method to decide. For example, it could be determined by the master slave relationship. Starting with a large territory, each probe will try to make its territory as small as possible.

Path Signalling to Avoid Probing

The model described in this section is not directly applicable for general purposes topology awareness systems. For applications where probes can be deployed strategically at certain locations in the network, this model works fine.

Under this mode of operation, probes avoid intrusive probing of non-compliant routers for topology data. Instead, probes rely on inter-probe signalling to learn about routing for non-compliant routers. Basically, each probe learns its local routing data via local interfaces and uses the network interface to learn about paths to all adjacent probes. A probe sends its local routing table and a representation of the paths to all its adjacent probes across the topology awareness system interface. This means that the central node of the system will have to implement algorithms, resembling those used by link-state routers to compile a complete map of the topology. For all local interfaces where there are non-compliant routers connected, the probe does the following:

Probe the path to all probes reachable via that outgoing interface. The difference to the adjacency tree is that the actual paths taken by packets are inspected here, not the logical branches.

The probing mentioned above is different from that used in the previous section. In this mode of operation probing means tracing paths with tools such as the traceroute or ping programs, rather then inspecting a node with SNMP.

Note that a path can only be discovered if there are probes at each end of it. This is a serious impediment if the application is a general purposes topology awareness system. But, if the application has specific requirements this method may be very useful. An example is for path sensitive resource management where probes could be deployed in ingress and egress nodes of the network that needs to be managed.

Network Interface

In a third preferred embodiment of the present invention the topology awareness probe comprises a network interface.

By using the network interface of FIG. 4, a probe can learn about topology information that is not locally available, by probing non-compliant routers. There are known methods for probing routers for topology information. Most relevant information is available in standardised MIBs and can be accessed with SNMP. Existing methods is used for this interface. One or more of the following events can trigger the procedure of collecting information from non-compliant routers, i.e. routers not comprises a topology awareness probe compliant with the rest of the probes within the topology awareness system:

Start-up. When a probe first starts up it should engage in information collection.

Routing protocol event. If events in the routing protocol can be monitored they can also be interpreted by the probe and used as a trigger for information collection. An example of when this is useful is when changes are to be discovered dynamically, in which case a routing protocol event is a sign that something has changed, and that information should be collected.

Periodical events. To be certain that the state of a probe is correct, the probe may employ periodical polling of information.

Explicit notifications from network elements, e.g., SNMP traps from routers.

Local Resources Interface

In a fourth preferred embodiment of the present invention the topology awareness probe comprises a local resources interface.

Depending on the router platform there will be different resources available. In general, there will be some kind of kernel APIs that allow pieces of software on the router to access routing and interface information. Another approach to local resources is to use SNMP locally to obtain the needed information. An example of locally available kernel APIs for routing information is the route that is described in a manual page for 'route' in section four (4) of the FreeBSD manual pages; The FreeBSD Kernel Interfaces Manual family of routines that are available on BSD based routers.

In domains where link-state routing is used, to gain topology awareness, the probe could access the link state database that is managed by routing protocol software. There are several advantages to using local interfaces:

Avoid network signalling overhead.

More reliable than using SNMP across the network

Dynamic topology awareness can be achieved either via inexpensive polling or, if the local interfaces provide such mechanisms, by receiving unsolicited call-backs (e.g., signals or interrupts) from other software components in the router.

The topology awareness probe according to the present invention, comprises at least the system interface. However, in addition to the system interface, the present invention may comprise any of the interfaces (i.e. network interface, local resources interface and probe adjacencies interface) described above, in any combination.

The methods for obtaining a topology awareness system according to the present invention as described above may be implemented by means of a computer program product comprises the software code means for performing the steps of the method. The computer program product is run on processing means in a router within an IP network. The computer program is loaded directly or from a computer usable medium, such as a floppy disc, a CD, the Internet etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for providing topology awareness information within an IP network, said IP network comprising a central node of a topology awareness system that stores and processes topology information, said central node connected to at least one topology awareness unit that is implemented in a network node within said IP network, said topology awareness unit comprising functionality of a topology awareness system interface, wherein the method comprises the steps of:

transmitting a registration message from one of the topology awareness units implemented within the network node to the central node;

adding an identity of said topology awareness unit to a list of known units at the central node; and transmitting a response message from the central node to the topology awareness unit, wherein said response message has a capability to order the topology awareness unit to:

keep a current relation with the central node, if the current relation between the topology awareness unit and the central node is accepted;

aggregate network topology information, if the central node determines that the topology awareness unit is to be used as an aggregation point; and redirect reporting of the network topology information to a previous aggregation point identified in the response message, if there exists a suitable aggregation point, the redirect response message causing the current relation between the topology awareness unit and the central node to be torn down and a new relation to be established between the topology awareness unit and the previous aggregation point.

2. Method according to claim 1, wherein the method comprises the further step of:

delivering the topology information from the topology awareness unit to said central node if the topology awareness unit is ordered to keep its current relationship with the central node.

3. Method according to claim 1, wherein the method comprises the further step of:

receiving topology information from other topology awareness units; and delivering said topology information together with the topology information of the other topology awareness units to the central node, if the topology awareness unit is ordered to aggregate.

4. Method according to claim 1, wherein the steps are repeated continuously.

5. Method according to claim 1, wherein all aggregation relations comprise a parent node and at least one child node.

6. Method according to claim 5, wherein the method comprises the further steps of:

issuing unsolicited aggregate messages from the topology awareness unit to any set of units it previously has had a parental relation to if a relation between said parent node and the at least one child node is lost; and issuing a further message from said topology awareness unit comprising information on new aggregation relations.

7. Method according to claim 1, wherein the method comprises the further steps of:

transmitting unsolicited messages from the topology awareness unit when topology changes within the IP network are detected; and filtering said unsolicited messages by the topology awareness unit in order to only transmit messages as a result of an actual change in the network topology, and avoid sending messages as a result of repeated updates.

8. Method according to claim 1, wherein the method comprises the further step of:

transmitting a compressed representation of topology information of a first unit to a second unit (or to the central node) in order to compare said compressed representation with a corresponding compressed representation for the second unit (or for the central node).

9. Method according to claim 8, wherein the method comprises the further step of:

performing synchronization between the first unit and the second unit (or the central node) if a difference between said compressed representation of the first unit and said compressed representation of the second unit (or the central node) is detected.

10. Method according to claim 1, wherein the topology awareness unit comprises functionality of a network interface, and wherein the method comprises the further step of:

collecting topology information from non-compliant routers.

11. Method according to claim 10, wherein said collecting step is performed by using SNMP (Simple Network Management Protocol).

12. Method according to claim 1, wherein the topology awareness unit comprises functionality of a probe adjacencies interface, and wherein the method comprises the further step of:
keeping tree-structured views of the IP network, wherein each unit is keeping itself as a root of a tree and wherein each branch of the tree consists of non-compliant routers as intermediate nodes and adjacent units as leaves.

13. Method according to claim 12, wherein each adjacent pair of units has one single relationship.

14. Method according to claim 12, wherein the method comprises the further step of:
keeping each adjacency alive by transmitting messages from each unit to substantially all of its adjacent units.

15. Method according to claim 12, wherein the method comprises the further steps of:
defining a territory of non-compliant routers that a unit is responsible for probing, wherein each non-compliant router belongs to a territory; and
keeping a list of all non-compliant routers belonging to the territory of said unit, wherein each router is associated with a metric that indicates a distance to the non-compliant router from said unit and an identifier of said unit.

16. Method according to claim 15, wherein there is one master node and one slave node for each pair of adjacent units, wherein the master and slave relation is determined at the adjacency establishment, the method comprising the further steps of:
sending a subset of the list of non-compliant routers to the master node from the slave node; and
comparing each router metric within the list within the slave node with a corresponding router metric within the list within the master node that occurs both in the slave list and the master list, wherein the unit that has a smallest metric associated with the router obtains said router in its territory.

17. Method according to claim 13, wherein the method comprises the further steps of:
obtaining local routing data by the unit via local interfaces; and
using a network interface by the unit to obtain path information to adjacent units, wherein the unit transmits its local routing table and a representation of the paths to its adjacent units across the topology awareness system interface.

18. Method according to claim 1, wherein the topology awareness unit comprises functionality of a local resources interface, wherein the method comprises the further step of:
obtaining topology information by using locally available resources at the network node wherein the unit is implemented.

19. Method according to claim 18, wherein said resources are kernel APIs.

20. Method according to claim 18, wherein said resources are approached by using Simple Network Management Protocol (SNMP).

21. A computer program product stored on a computer readable storage medium directly loadable into an internal memory of a router within an IP network comprising software code portions for performing the steps of claim 1.

22. A computer program product stored on a computer usable medium, comprising a readable program for causing a router within an IP network to control the execution of the steps of claim 1.

23. A topology awareness unit for providing topology awareness information within an IP network, the topology awareness unit implemented within a network node in the IP network and belonging to a topology awareness system that comprises additional topology awareness units and a central node, wherein said topology awareness unit comprises functionality of a topology awareness system interface, including:
means for transmitting a registration message to the central node; and
means for receiving a response message from the central node, wherein said response message has a capability to order the topology awareness unit to:
keep a current relation with the central node, if the current relation between the topology awareness unit and the central node is accepted;
aggregate network topology information, if the central node determines that the topology awareness unit is to be used as an aggregation point; and
redirect reporting of network topology information to a previous aggregation point identified in the response message, if there exists a suitable aggregation point, the redirect response message causing the current relation between the topology awareness unit and the central node to be torn down and a new relation to be established between the topology awareness unit and the previous aggregation point.

24. Topology awareness unit according to claim 23, wherein said topology awareness unit comprises means for collecting topology information from non-compliant routers.

25. Topology awareness unit according to claim 23, wherein said topology awareness unit comprises functionality of a probe adjacencies interface, including:
means for keeping tree-structured views of the IP network, wherein each unit is keeping itself as a root of a tree and wherein each branch of the tree comprises non-compliant routers as intermediate nodes and adjacent units as leaves.

26. Topology awareness unit according to claim 23, wherein said topology awareness unit comprises functionality of a local resources interface, including:
means for obtaining topology information by using locally available resources at the network node wherein the topology awareness unit is implemented.

27. The method according to claim 10, wherein said non-compliant routers are routers other than said network node in which said topology awareness unit is implemented.

* * * * *